(12) United States Patent
Kumagai et al.

(10) Patent No.: US 11,247,323 B2
(45) Date of Patent: Feb. 15, 2022

(54) ELECTRIC WORKING MACHINE AND METHOD OF CONTROLLING ROTATIONAL STATE OF MOTOR OF ELECTRIC WORKING MACHINE

(71) Applicant: MAKITA CORPORATION, Anjo (JP)

(72) Inventors: Ryunosuke Kumagai, Anjo (JP); Masahiro Watanabe, Anjo (JP); Jiro Suzuki, Anjo (JP); Kosuke Ito, Anjo (JP)

(73) Assignee: MAKITA CORPORATION, Anjo (JP)

( * ) Notice: Subject to any disclaimer, the term of this patent is extended or adjusted under 35 U.S.C. 154(b) by 285 days.

(21) Appl. No.: 16/056,717

(22) Filed: Aug. 7, 2018

(65) Prior Publication Data

US 2019/0047132 A1    Feb. 14, 2019

(30) Foreign Application Priority Data

Aug. 9, 2017    (JP) .............................. JP2017-154191

(51) Int. Cl.

| | | |
|---|---|---|
| *B25B 23/151* | (2006.01) | |
| *B25F 5/00* | (2006.01) | |
| *B25B 21/00* | (2006.01) | |
| *B25B 23/147* | (2006.01) | |
| *H02P 6/08* | (2016.01) | |
| *B25B 21/02* | (2006.01) | |
| *H02K 7/14* | (2006.01) | |
| *H02P 27/04* | (2016.01) | |

(52) U.S. Cl.
CPC ............ *B25F 5/001* (2013.01); *B25B 21/008* (2013.01); *B25B 21/02* (2013.01); *B25B 23/1475* (2013.01); *H02K 7/145* (2013.01); *H02P 6/08* (2013.01); *H02P 27/04* (2013.01)

(58) Field of Classification Search
CPC .......... B25D 9/26; B25D 11/005; B25F 5/001
See application file for complete search history.

(56) References Cited

U.S. PATENT DOCUMENTS

| | | | |
|---|---|---|---|
| 6,687,567 B2 | 2/2004 | Watanabe | |
| 7,419,013 B2 * | 9/2008 | Sainomoto | .......... B25B 23/1405 173/181 |
| 7,516,801 B2 | 4/2009 | Meixner et al. | |

(Continued)

FOREIGN PATENT DOCUMENTS

| | | |
|---|---|---|
| CN | 1607075 A | 4/2005 |
| CN | 1695899 A | 11/2005 |

(Continued)

OTHER PUBLICATIONS

May 29, 2020 Office Action Issued in U.S. Appl. No. 16/052,747.

(Continued)

*Primary Examiner* — Eyamindae C Jallow
(74) *Attorney, Agent, or Firm* — Oliff PLC

(57) ABSTRACT

An electric working machine in one aspect of the present disclosure includes a motor, a setter, and a controller. The setter is configured to modifiably set a change characteristic in changing a rotational state of the motor from a low speed rotation to a high speed rotation. The high speed rotation is greater than the low speed rotation in rotational frequency of the motor.

5 Claims, 15 Drawing Sheets

(56) References Cited

U.S. PATENT DOCUMENTS

| | | | |
|---|---|---|---|
| 7,806,198 B2* | 10/2010 | Puzio | B25B 21/02 173/1 |
| 8,179,069 B2 | 5/2012 | Matsunaga et al. | |
| 8,584,770 B2* | 11/2013 | Zhang | B25B 21/00 173/178 |
| 8,674,640 B2 | 3/2014 | Suda et al. | |
| 8,678,106 B2 | 3/2014 | Matsunaga et al. | |
| 8,794,348 B2* | 8/2014 | Rudolph | B25B 21/02 173/48 |
| 8,890,449 B2 | 11/2014 | Suzuki et al. | |
| 8,919,456 B2* | 12/2014 | Ng | G05B 15/02 173/11 |
| 8,981,680 B2 | 3/2015 | Suda et al. | |
| 9,579,776 B2* | 2/2017 | Arimura | B25B 21/02 |
| 10,343,268 B2 | 7/2019 | Hirabayashi et al. | |
| 2005/0109519 A1 | 5/2005 | Kawai et al. | |
| 2005/0263303 A1* | 12/2005 | Shimizu | B25B 23/1475 173/2 |
| 2005/0263305 A1* | 12/2005 | Shimizu | B25B 21/02 173/2 |
| 2006/0185869 A1 | 8/2006 | Arimura | |
| 2007/0000676 A1 | 1/2007 | Arimura | |
| 2011/0152029 A1* | 6/2011 | Rudolph | B25F 5/001 475/271 |
| 2011/0284256 A1 | 11/2011 | Iwata | |
| 2013/0133911 A1* | 5/2013 | Ishikawa | B25D 11/068 173/176 |
| 2015/0047866 A1* | 2/2015 | Sakai | B25F 5/00 173/179 |
| 2015/0231770 A1* | 8/2015 | Kusakawa | B25B 23/1475 173/93.5 |
| 2016/0107297 A1* | 4/2016 | Ishikawa | B25B 21/008 173/179 |
| 2016/0121467 A1* | 5/2016 | Ng | B25B 21/026 173/176 |
| 2016/0129576 A1* | 5/2016 | Nishikawa | B25D 11/125 173/2 |
| 2016/0151845 A1* | 6/2016 | Yamamoto | B23D 49/16 173/179 |
| 2016/0250743 A1* | 9/2016 | Kikuchi | B25F 5/02 173/46 |

FOREIGN PATENT DOCUMENTS

| | | | | |
|---|---|---|---|---|
| CN | 102248522 A | | 11/2011 | |
| CN | 105522520 A | | 4/2016 | |
| CN | 106998168 A | | 8/2017 | |
| JP | 2005-324264 A | | 11/2005 | |
| JP | 2011-240441 A | | 12/2011 | |
| JP | 2013-226626 A | | 11/2013 | |
| JP | 2015-024512 A | | 2/2015 | |
| JP | 2015037822 A | * | 2/2015 | B25F 5/001 |
| JP | 2015-188981 A | | 11/2015 | |
| JP | 2016-078230 A | | 5/2016 | |
| JP | 2016-135108 A | | 7/2016 | |

OTHER PUBLICATIONS

Sep. 28, 2020 Office Action issued in Chinese Patent Application No. 201810884572.9.
Jun. 18, 2021 Office Action issued in U.S. Appl. No. 16/052,747.
May 7, 2021 Office Action issued in Chinese Patent Application No. 201810884572.9.
Dec. 9, 2020 Office Action issued in U.S. Appl. No. 16/052,747.
Feb. 24, 2021 Office Action issued in Japanese Patent Application No. 2017-154191.
Mar. 2, 2021 Office Action issued in Japanese Patent Application No. 2017-154192.

* cited by examiner

| SCREW | LOW SPEED SETTING | HIGH SPEED SETTING | CHANGE RATE SETTING |
|---|---|---|---|
| SCWa | 1ST LOW SPEED MODE | 1ST HIGH SPEED MODE | 1ST SLOPE A |
| | | | 2ND SLOPE B |
| SCWb | 1ST LOW SPEED MODE | 2ND HIGH SPEED MODE | 1ST SLOPE A |
| | | | 2ND SLOPE B |
| SCWc | 1ST LOW SPEED MODE | 3RD HIGH SPEED MODE | 1ST SLOPE A |
| | | | 2ND SLOPE B |
| SCWd | 2ND LOW SPEED MODE | 1ST HIGH SPEED MODE | 1ST SLOPE A |
| | | | 2ND SLOPE B |
| SCWe | 2ND LOW SPEED MODE | 2ND HIGH SPEED MODE | 1ST SLOPE A |
| | | | 2ND SLOPE B |
| SCWf | 2ND LOW SPEED MODE | 3RD HIGH SPEED MODE | 1ST SLOPE A |
| | | | 2ND SLOPE B |
| SCWg | 3RD LOW SPEED MODE | 1ST HIGH SPEED MODE | 1ST SLOPE A |
| | | | 2ND SLOPE B |
| SCWh | 3RD LOW SPEED MODE | 2ND HIGH SPEED MODE | 1ST SLOPE A |
| | | | 2ND SLOPE B |
| SCWi | 3RD LOW SPEED MODE | 3RD HIGH SPEED MODE | 1ST SLOPE A |
| | | | 2ND SLOPE B |

FIG. 5

ELECTRIC WORKING MACHINE AND METHOD OF CONTROLLING ROTATIONAL STATE OF MOTOR OF ELECTRIC WORKING MACHINE

CROSS-REFERENCE TO RELATED APPLICATIONS

This application claims the benefit of Japanese Patent Application No. 2017-154191 filed Aug. 9, 2017 in the Japan Patent Office, the disclosure of which is incorporated herein by reference.

BACKGROUND

The present disclosure relates to an electric working machine that is configured to change a rotational state of a motor from a low speed rotation to a high speed rotation in response to an establishment of a condition for change.

A rotary impact tool disclosed in Japanese Unexamined Patent Application Publication No. 2016-078230 is configured to rotate a motor in a low speed at the initiation of the drive of the motor. After a given number of impact, the rotary impact tool determines that a condition for change is established and changes the rotational state of the motor from the low speed rotation to the high speed rotation.

SUMMARY

The aforementioned rotary impact tool is configured to change the rotational state of the motor from the low speed rotation to the high speed rotation with a predefined constant change characteristic.

Thus, the time required for the rotational state to change from the low speed rotation to the high speed rotation is substantially constant and does not depend on a type of fastener to be fastened by the rotary impact tool. As a consequence, certain types of fasteners cannot be always appropriately fastened by the rotary impact tool.

Such a problem does not only occur in rotary impact tools; it can occur in any types of electric working machines that are configured to change the rotational state of the motor from a low speed rotation to a high speed rotation in response to an establishment of a given condition for change, such as an increase in load after initiation of the motor drive.

Preferably, one aspect of the present disclosure can modify a change characteristic in changing a rotational state of a motor of an electric working machine from a low speed rotation to a high speed rotation in response to an establishment of a condition for change.

An electric working machine in a first aspect of the present disclosure includes a motor, a setter, and a controller. The setter is configured to modifiably set a change characteristic in changing the rotational state of the motor from a low speed rotation to a high speed rotation. The high speed rotation is greater than the low speed rotation in rotation frequency of the motor. The controller is configured to control the rotational state of the motor. The controller is also configured to initiate drive of the motor at the low speed rotation. The controller is also configured to change the rotational state of the motor, in response to the establishment of a given condition for change after the drive of the motor is initiated, from the low speed rotation to the high speed rotation in accordance with the change characteristic that is set by the setter.

Such an electric working machine can change the rotational state of the motor from the low speed rotation to the high speed rotation in response to the establishment of the condition for change.

The change characteristic in changing from the low speed rotation to the high speed rotation can be modifiably set by the setter. Thus, a change in rotational state of the motor (in other words, an increase rate of the rotational frequency) can be appropriately set depending on the type of a fastener, and the surrounding environment of a job site of the electric working machine.

The aforementioned electric working machine can be usable for a user of the electric working machine and thus can improve the work efficiency.

The setter may be configured to modifiably set the change characteristic in accordance with a command delivered to the setter. Such a setter enables the user to voluntarily set the change characteristic. This improves the usability of the electric working machine.

The setter may be configured to modifiably set the change characteristic depending on a state of the motor during a period from the initiation of the motor drive to the establishment of the condition for change.

The setter configured as above enables the change characteristic to be automatically set depending on the state of the motor. The user is thus not required to manually set the change characteristic, which can further improve the usability of the electric working machine.

The setter may be configured to modifiably set the change characteristic in accordance with a magnitude of a load imposed on the motor during a period from the initiation of the motor drive to the establishment of the condition for change. The setter may be configured to modifiably set the change characteristic such that, for example, the larger the magnitude of the load is, the less an increase rate of the rotational frequency of the motor becomes.

In this case, the larger the load imposed on the motor, the slower the rotational frequency of the motor increases. This can reduce a problem such as an interruption of work due to a dislocation of a shaft of the electric working machine, rotated by the motor, from a fastener.

The change characteristic may specify a change rate from the low speed rotation to the high speed rotation.

The controller may be configured to control a duty ratio of a drive signal of the motor. In this case, the change characteristic may specify a change rate of the duty ratio of the drive signal, from a first duty ratio to a second duty ratio. The first duty ratio corresponds to the low speed rotation. The second duty ratio corresponds to the high speed rotation.

The aforementioned electric working machine may include an impact mechanism, and an impact detector configured to detect an impact by the impact mechanism. The controller may be configured to increment a count value in response to the impact detector detecting the impact by the impact mechanism. The controller may further be configured to determine whether the condition for change is established based on the count value.

The aforementioned electric working machine may include a manipulator that is configured to be manipulated by the user to manipulate (control) the rotational state of the motor. The setter may be arranged in the electric working machine separately from the manipulator.

In the present disclosure, the rotational frequency of the motor corresponds to the number of rotation of the motor per unit time or rotational speed of the motor.

Another aspect of the present disclosure is a method of controlling a rotational state of a motor of an electric working machine. This method may include selecting a change characteristic in changing the rotational state of the motor from a low speed rotation to a high speed rotation. The high speed rotation may be greater than the low speed rotation in rotational frequency of the motor. This method may include initiating a drive of the motor at the low speed rotation. This method may include changing the rotational state of the motor, in response to an establishment of the given condition for change, from the low speed rotation to the high speed rotation in accordance with the change characteristic selected.

Such a method allows the rotational state of the motor to be changed from the low speed rotation to the high speed rotation in accordance with the selected change characteristic.

BRIEF DESCRIPTION OF THE DRAWINGS

An example embodiment of the present disclosure will be described hereinafter with reference to the accompanying drawings, in which:

FIG. 5 is an explanatory diagram showing control patterns of rotational frequency of a motor in a speed-change mode, which is set in an input process of an impact force change SW shown in FIG. 4;

DETAILED DESCRIPTION OF THE PREFERRED EMBODIMENTS

In the present embodiment, rechargeable impact driver 1 (hereinafter also simply called "driver 1") will be explained as one example of an electric working machine in the present disclosure.

Figure 1:
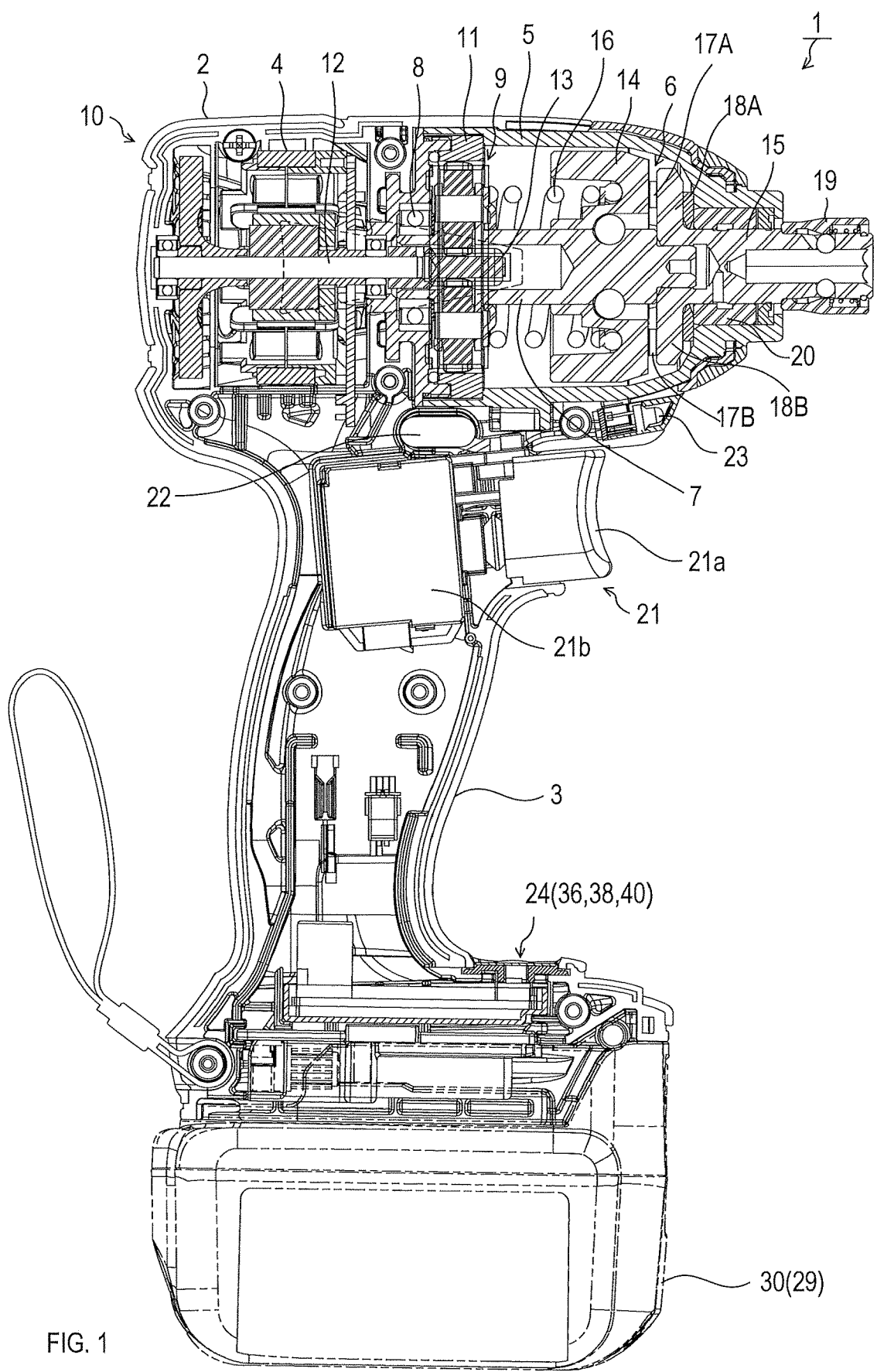
FIG. 1 is a vertical sectional view of a rechargeable impact driver in an embodiment.

FIG. 1 shows that the driver 1 includes a tool main body 10, and a battery pack 30 configured to supply an electric power to the tool main body 10.

The tool main body 10 includes a housing 2 configured to house components such as a motor 4 and an impact mechanism 6, and a grip 3 formed to protrude downwardly (towards the downward direction of FIG. 1) from a lower portion of the housing 2.

The housing 2 houses the motor 4 in its rear area (left side area in FIG. 1). A bell-shaped hammer casing 5 is assembled in a front area of the housing 2 in front of the motor 4 (right side area in FIG. 1). The impact mechanism 6 is housed in this hammer casing 5.

The hammer casing 5 coaxially houses a spindle 7. The spindle 7 includes a hollow space in its rear end area. An outer periphery of the rear end area of the spindle 7 is rotatably supported by a ball bearing 8 that is arranged in a rear end area of the hammer casing 5.

The hammer casing 5 also houses a planetary gear mechanism 9 including two planetary gears that are rotatably supported and arranged point symmetrically about the rotational axis of the spindle 7. The planetary gear mechanism 9 is situated in a front side of the ball bearing 8. The planetary gear mechanism 9 meshes with an internal gear 11 that is arranged on an inner circumferential surface at the rear side of the hammer casing 5.

The planetary gear mechanism 9 is configured to mesh with a pinion 13 that is arranged at a front end of an output shaft 12 of the motor 4.

The impact mechanism 6 includes the spindle 7, a hammer 14 arranged around the spindle 7, an anvil 15 that is rotatably supported in a front side of the hammer 14, and a coil spring 16 configured to bias the hammer 14 towards the front.

Specifically, the hammer 14 is coupled to the spindle 7 so as to be rotatable together with the spindle 7 and movable along the rotational axis. The hammer 14 is biased towards the front (towards the anvil 15) by the coil spring 16.

A front end of the spindle 7 is rotatably supported by loosely and coaxially inserted in a rear end of the anvil 15.

The anvil 15 is configured to rotate about the rotational axis due to a rotational force and an impact force by the hammer 14. The anvil 15 is supported by a bearing 20, which is arranged in a front end of the housing 2, so as to be freely rotatable about the rotational axis but not to be movable along the rotational axis.

A chuck sleeve 19 is arranged in a front end of the anvil 15 for attachment of various tool bits (omitted in drawings) such as a driver bit and a socket bit.

The output shaft 12 of the motor 4, the spindle 7, the hammer 14, the anvil 15, and the chuck sleeve 19 are all arranged coaxially with each other.

On a front end surface of the hammer 14, a first and second impact protrusions 17A and 17B that are configured to apply the impact force to the anvil 15 are arranged at 180° intervals with each other in a circumferential direction.

On the rear end of the anvil 15, a first and second impact arms 18A and 18B that are configured to be abuttable respectively against the first and second impact protrusions 17A and 17B of the hammer 14 are arranged at 180° intervals with each other in the circumferential direction.

The first and second impact protrusions 17A and 17B are caused to abut respectively against the first and second impact arms 18A and 18B in response to the hammer 14 being biased and retained in the front end area of the spindle 7 due to a biasing force of the coil spring 16.

If, in this biased state, the spindle 7 rotates via the planetary gear mechanism 9 due to the rotational force of the motor 4, then the hammer 14 rotates together with the spindle 7, which transmits the rotational force of the hammer 14 to the anvil 15 through the first impact protrusion 17A, the second impact protrusion 17B, the first impact arm 18A, and the second impact arm 18B.

This consequently causes the tool bit, such as a driver bit, attached to a tip of the anvil 15 to rotate and enables screw fastening.

If the anvil 15 receives an external torque equal to or greater than a specified value due to the screw being fastened to a predefined position, then the rotational force (torque) of the hammer 14 on the anvil 15 also becomes equal to or greater than a specified value.

As a consequence, the hammer 14 moves towards the rear against the biasing force of the coil spring 16, which causes the first and second impact protrusions 17A and 17B to climb respectively over the first and second impact arms 18A and 18B. In other words, the impact protrusions 17A and 17B temporarily disengage from the respective first and second impact arms 18A and 18B respectively, and thus the hammer 14 idles.

The idling hammer 14 moves forward again due to the biasing force of the coil spring 16 while rotating the spindle 7. As a result, the first and second impact protrusions 17A and 17B provide an impact against the respective first and second impact arms 18A and 18B in the rotational direction.

Accordingly, in the driver 1, every time the anvil 15 receives a torque equal to or greater than the specified value, the anvil 15 receives an impact repeatedly by the hammer 14. Such intermittent application of the impact force of the hammer 14 to the anvil 15 enables a screw fastening at a high torque.

The grip 3 is configured to be held by an operator. The grip 3 includes a trigger 21 in its upper area.

The trigger 21 includes a manipulation device 21a configured to be pulled by the operator, and a detector 21b configured to detect an operation state of the manipulation device 21a.

Above the trigger 21 (in a lower end area of the housing 2), a rotational direction switch (SW) 22 is provided to be used to change the rotational direction of the motor 4 to either a normal direction or a reverse direction. In the present embodiment, the normal direction of the motor 4 is the clockwise direction when viewing the driver 1 from the rear to the front; thus the counterclockwise direction is the reverse direction of the motor 4.

The housing 2 also includes, in its lower front end, an illuminator 23 including an LED and configured to illuminate ahead of the driver 1 with the LED in response to a pulling manipulation on the trigger 21.

A display panel 24 is located in a lower front area of the grip 3. The display panel 24 is configured to display information such as remaining energy in a battery 29 in the battery pack 30 and an operation mode of the driver 1.

In addition, a mode change SW 36, an impact force change SW 38, an illuminating SW 40 (see FIG. 2) are arranged near the display panel 24.

The mode change SW 36 is provided to change the operation mode of the driver 1 to either (i) a normal mode to control the rotation of the motor 4 in accordance with an amount of manipulation on the trigger 21 or (ii) a speed-change mode to change the rotational state of the motor 4 between a low speed rotation and a high speed rotation.

The impact force change SW 38 is provided to change the impact force by selecting, from a predefined control pattern, a control pattern to set the rotational frequency for a low speed rotation and a high speed rotation in the speed-change mode, and a change rate (amount of change per unit time) of the rotational frequency when changing from the low speed rotation to the high speed rotation.

The illuminating SW 40 is provided to turn the illuminator 23 ON or OFF when the trigger 21 is manipulated.

The battery pack 30 housing the battery 29 is detachably attached to a lower end of the grip 3. The battery pack 30 is attached by sliding against the lower end of the grip 3 from the front side to the rear side of the grip 3.

In the present embodiment, the battery 29 housed in the battery pack 30 is a rechargeable battery, for example, a lithium ion battery.

In the present embodiment, the motor 4 is implemented with a three-phase brushless motor including armature windings (hereinafter referred to as "phase windings") each corresponding respectively to U, V, and W phases.

Figure 2:
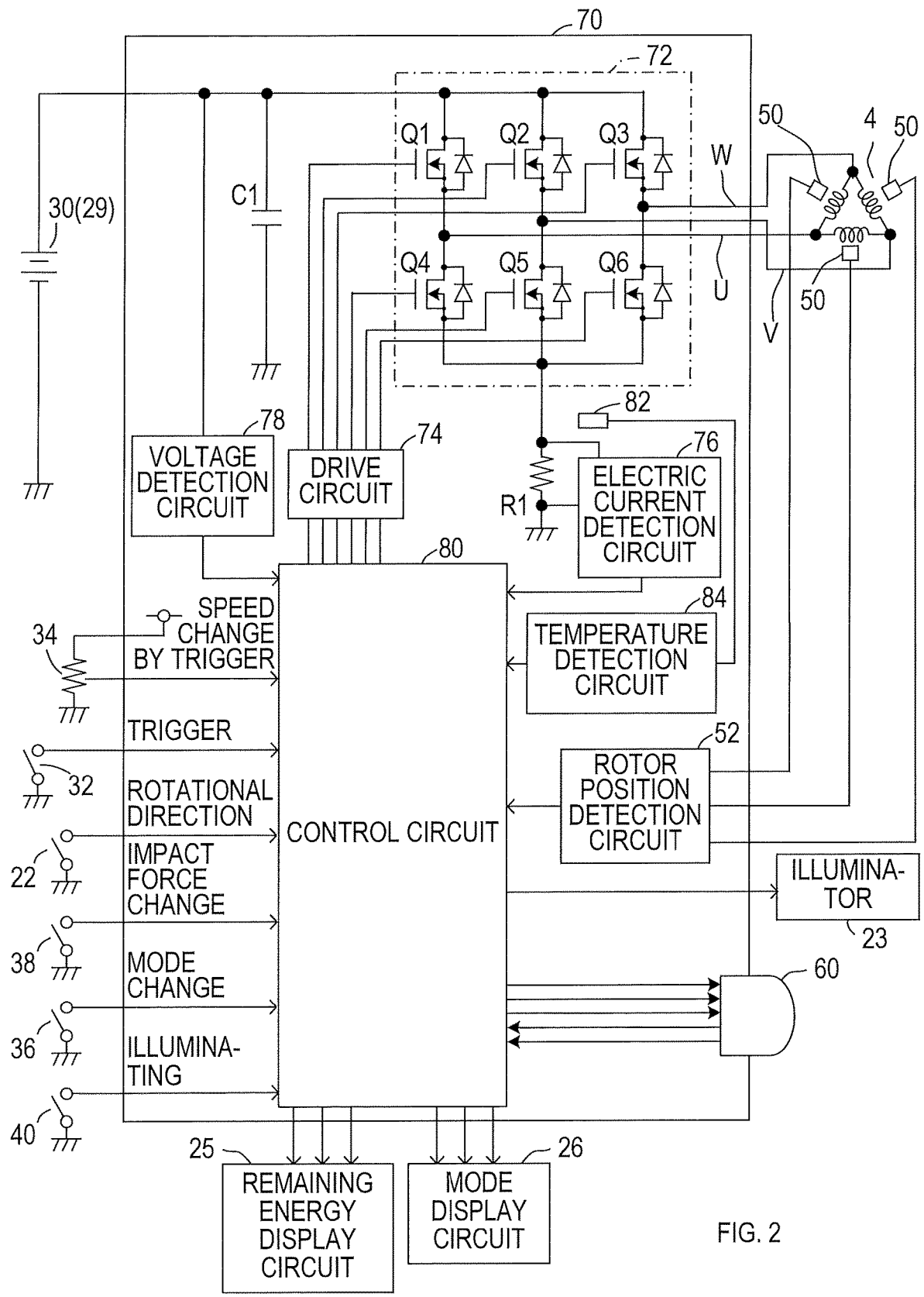
FIG. 2 is a block diagram showing an electrical configuration of a motor driver mounted in the rechargeable impact driver.

FIG. 2 shows a motor driver 70 arranged inside the grip 3. The motor driver 70 is configured to drive control the motor 4 with the electric power supplied from the battery pack 30

The motor driver 70 includes a bridge circuit 72, a drive circuit 74, and a control circuit 80.

The bridge circuit 72 is configured to receive the electric power from the battery pack 30 and supply a current to each phase windings in the motor 4. More specifically, the bridge circuit 72 in the present embodiment is a three-phase full bridge circuit including six switching elements Q1 to Q6. In the present embodiment, each of the switching elements Q1 to Q6 is implemented with, but not limited to, a metal-oxide-semiconductor field-effect transistor (MOSFET).

In the bridge circuit 72, the switching elements Q1, Q2, and Q3 are so-called high-side switches and arranged between respective terminals U, V, and W of the motor 4 and a power-supply line, which is coupled to the positive electrode of the battery 29.

Other switching elements Q4, Q5, and Q6 are so-called low-side switches and arranged between the respective terminals U, V, and W of the motor 4 and a ground line, which is coupled to the negative electrode of the battery 29.

In a power-supply path from the battery pack 30 to the bridge circuit 72, a capacitor C1 is provided to reduce variation of a voltage of the battery 29 (hereinafter referred to as "battery voltage").

The drive circuit 74 is configured to supply current to each phase winding in the motor 4 to rotate the motor 4 by turning ON/OFF each of the switching elements Q1 to Q6 in accordance with control signals transmitted from the control circuit 80.

The control circuit 80 includes a Micro Controller Unit (MCU) including a CPU, a ROM, and a RAM. The control circuit 80 is configured to rotate the motor 4 by turning ON/OFF the switching elements Q1 to Q6 to control current supplied to each phase windings in the motor 4. In replacement of or in addition to the MCU, the control circuit 80 may include a combination of electronic components such as discrete elements, an Application Specified Integrated Circuit (ASIC), an Application Specific Standard Product (ASSP), a programmable logic device such as a Field Programmable Gate Array (FPGA), or a combination of these.

The control circuit 80 operates by a power-supply voltage (direct current (DC) constant voltage) generated in a regulator (not shown) in the motor driver 70.

The regulator is configured to receive the electric power from the battery pack 30 and generate the power-supply voltage for operating the control circuit 80. The generated power-supply voltage is also used to activate peripheral circuits of the control circuit 80.

The control circuit 80 is coupled to the rotational direction SW 22, the illuminator 23, a remaining energy display circuit 25, a mode display circuit 26, a trigger SW 32, a manipulation amount detector 34, the mode change SW 36, the impact force change SW 38, and the illuminating SW 40. The trigger SW 32 is included in the aforementioned detector 21b and is turned on by a pulling manipulation on the aforementioned manipulation device 21a. A resistance value of the manipulation amount detector 34 changes depending on an amount of manipulation (pulled amount) on the manipulation device 32. The aforementioned remaining energy display circuit 25 and mode display circuit 26 are arranged in the aforementioned display panel 24.

The control circuit 80 is also coupled to a wireless dongle 60. The wireless dongle 60 wirelessly communicates with an external device such as a smartphone via, for example, a wireless LAN. The wireless dongle 60 enables the user of the driver 1 to set up an operation of the control circuit 80 via the external device.

The motor driver 70 includes an electric current detection circuit 76, a voltage detection circuit 78, a temperature detection circuit 84, and a rotor position detection circuit 52. Detection signals from these detection circuits are delivered to the control circuit 80.

The electric current detection circuit 76 includes a resistor R1 that is serially coupled to a current path on the negative-side of the motor 4. The electric current detection circuit 76 is configured to detect a voltage across the resistor R1 as a current detection signal. The voltage detection circuit 78 is configured to detect the battery voltage supplied from the battery pack 30.

The temperature detection circuit 84 is configured to detect a temperature of the motor driver 70 based on a detection signal from a temperature sensor 82. The rotor position detection circuit 52 is configured to detect a rotational position and the rotational frequency of the motor 4 based on a detection signal from a rotation sensor 50. The rotation sensor 50 is located in the motor 4 and configured to detect the rotational position (angle) of the motor 4. More specifically, the rotation sensor 50 may be implemented with a Hall IC that is configured to generate a rotation detection signal every time the motor 4 rotates for a given angle. The Hall IC may include, for example, three Hall elements, which may be arranged to respectively correspond to the U, V, and W phases of the motor 4.

The control circuit 80 is configured to set the rotational frequency and the rotational direction of the motor 4 in accordance with inputs received from the rotational direction SW 22, the trigger SW 32, the manipulation amount detector 34, the mode change SW 36, the impact force change SW 38, and the wireless dongle 60. The control circuit 80 is also configured to drive control the motor 4 based on the aforementioned detection signals.

Hereinafter, a control process executed in the control circuit 80 to drive control the motor 4 will be explained.

Figure 3:
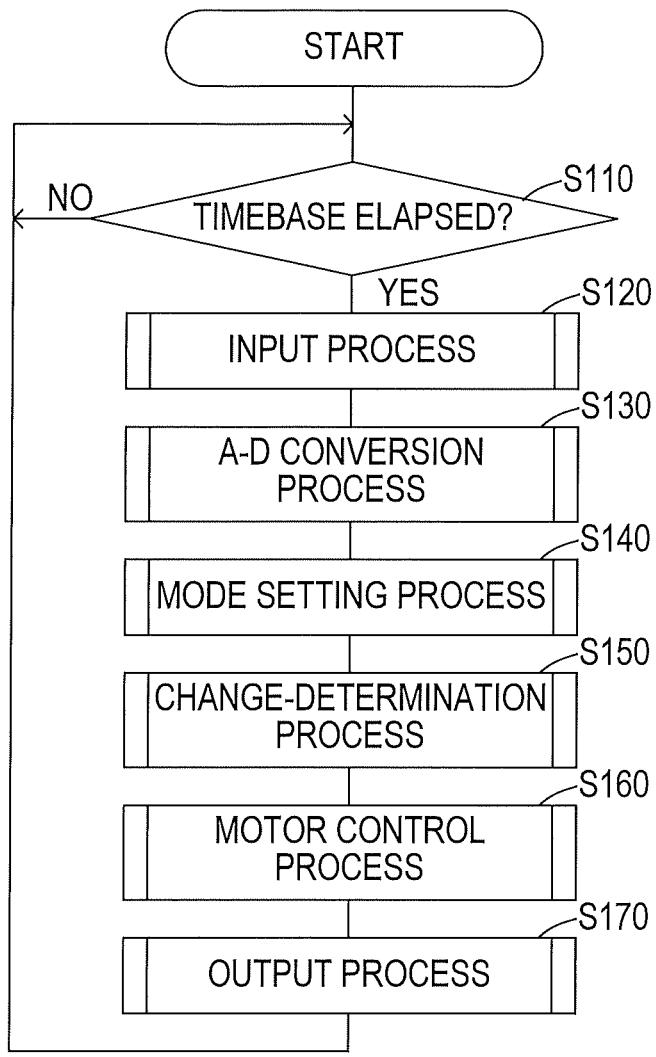
FIG. 3 is a flow chart showing control process executed in a control circuit.

As shown in FIG. 3, the control circuit 80 repeatedly executes a series of processes from S120 to S170 (S represents step) at a specified control cycle (timebase). Specific processes are explained below.

In S110, the control circuit 80 waits for an elapse of the specified control cycle by determining whether the timebase has elapsed (S110: NO). If the control circuit 80 determines that the timebase has elapsed (S110: YES), then the control circuit 80 proceeds the process to S120.

Figure 4:
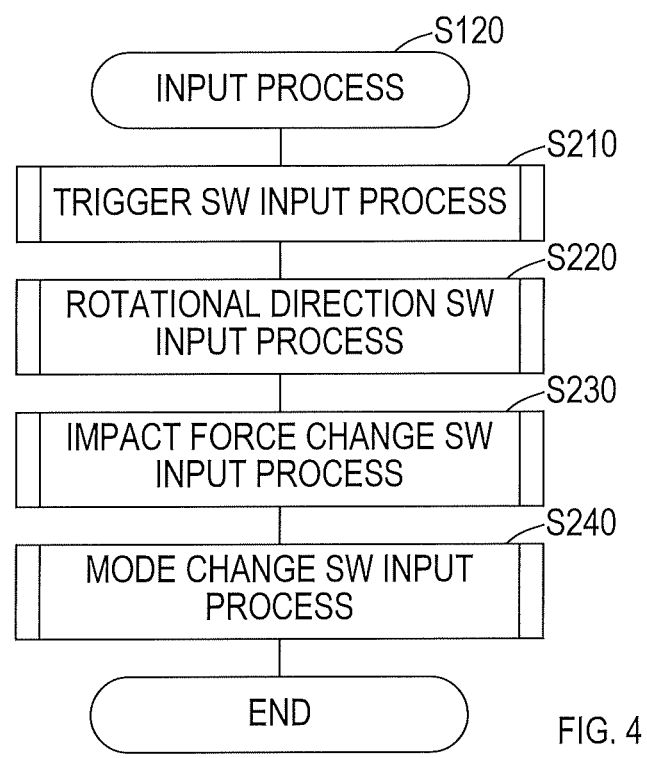
FIG. 4 is a flow chart showing input process executed in S120 in FIG. 3.

In S120, the control circuit 80 executes an input process shown in FIG. 4.

As shown in FIG. 4, in this input process, the control circuit 80 executes a trigger SW input process in S210 and detects whether the trigger SW 32 is placed in the ON state or in the OFF state. In response to a completion of the trigger SW input process, the control circuit 80 then executes a rotational direction SW input process in S220 to detect a rotational direction of the motor 4 at the time of the drive of the motor 4 based on the ON/OFF state of the rotational direction SW 22.

In the subsequent S230, the control circuit 80 executes an impact force change SW input process to detect whether the impact force change SW 38 is placed in the ON state or in the OFF state. In response to a completion of the impact force change SW input process, the control circuit 80 then executes a mode change SW input process in S240 to detect whether the mode change SW 36 is placed in the ON state or in the OFF state.

In response to a completion of the mode change SW input process, the control circuit 80 then ends the input process in S120 and proceed to S130 as shown in FIG. 3.

In S130, the control circuit 80 executes an analog to digital (A-D) conversion process. In the A-D conversion process, the control circuit 80 converts the amount of manipulation (pulled amount) of the trigger 21 delivered from the manipulation amount detector 34, a detection signal from the electric current detection circuit 76, the detection signal from the voltage detection circuit 78, and the detection signal from the temperature detection circuit 84 into respective digital value, and store the respective digital value into the RAM inside the control circuit 80.

In S140, the control circuit 80 executes a mode-setting process to set the operation mode of the driver 1 at the time of driving the motor 4 based on the ON state or the OFF state of the mode change SW 36 and the impact force change SW 38 detected in the input process in S120.

More specifically, in S140, the control circuit 80 sets the operation mode to the speed-change mode if the mode change SW 36 is placed in the ON state. If the mode change SW 36 is placed in the OFF-state, then the control circuit 80 sets the operation mode to the normal mode.

Also, if the impact force change SW 38 is placed in the ON state, then the control circuit 80 changes the control pattern of the rotational frequency of the motor 4 in the speed-change mode.

As shown in FIG. 5, the speed-change mode in the present embodiment includes a first low speed mode, a second low speed mode, a third low speed mode, a first high speed mode, a second high speed mode, and a third high speed mode.

The control circuit 80 has a first change rate and a second change rate, each of which specifies a change characteristic in the rotational frequency of the motor 4 from the low speed rotation to the high speed rotation in the speed-change mode. The first change rate has a first slope (or gradient) A; the second change rate has a second slope B that is steeper than the first slope A (which means that A<B).

The first to third low speed modes, the first to third high speed modes, and the first and second change rates are each allocated to one of the screws SCWa to SCWi depending on the types (characteristics) of the screws SCWa to SCWi. The screws SCWa to SCWi are designed for being fastened into a workpiece. In the present embodiment, two types of control patterns are allocated for each of the screws SCWa to SCWi; that is, the control circuit 80 has 18 types of control patterns in total.

In S140, every time the user manipulates (turns ON) the impact force change SW 38, the control circuit 80 sequentially selects one control pattern from the aforementioned preset control patterns.

As a consequence, the user can select the control pattern that can produce the impact force suitable for the screw to be fastened into the workpiece.

The first to third low speed modes are provided to change target rotational frequency of the motor 4 at a low speed rotation in three stages, namely High (the third low speed mode), Middle (the second low speed mode), and Low (the first low speed mode). The first to third high speed modes are provided to change target rotational frequency of the motor 4 at a high speed rotation in three stages, namely High (the third high speed mode), Middle (the second high speed mode), and Low (the first high speed mode).

In the present embodiment, the control circuit 80 uses a map or an arithmetic expression to set command rotational frequency of the motor 4 in accordance with the amount of manipulation. More specifically, the control circuit 80 has a respective map or a respective arithmetic expression for each of the first to third low speed modes and the first to third high speed modes.

In other words, to rotate the motor 4 at a low speed, the control circuit 80 sets the command rotational frequency by using the respective map or the respective arithmetic expression corresponding to the first to third low speed modes. Similarly, to rotate the motor 4 in a high speed, the control circuit 80 sets the command rotational frequency by using the respective map or the respective arithmetic expression corresponding to the first to third high speed modes.

Figure 6:
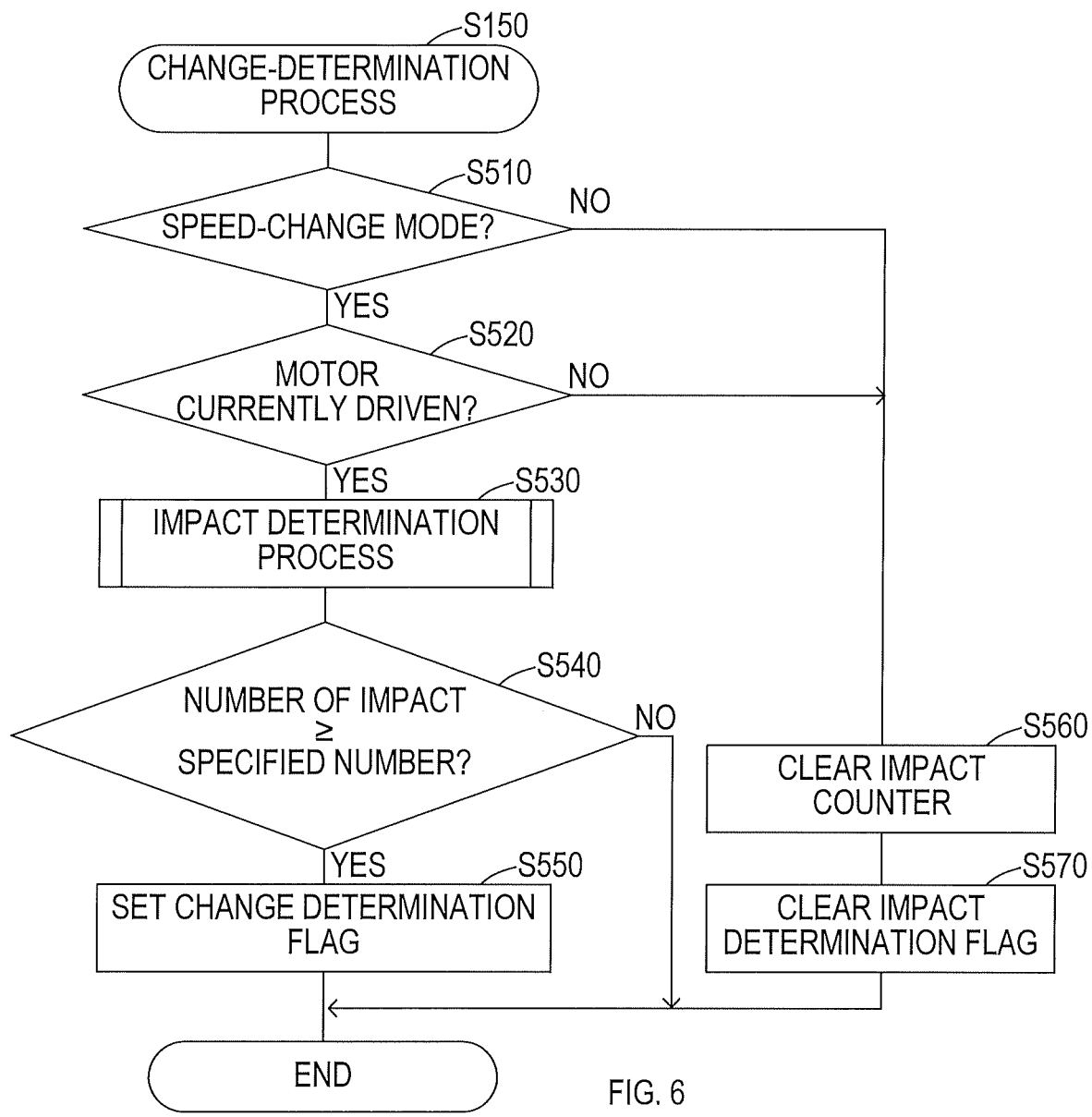
FIG. 6 is a flow chart showing change-determination process executed in S150 in FIG. 3.

In S150, the control circuit 80 executes a change-determination process shown in FIG. 6. In the change-determination process, the control circuit 80 determines whether the rotational state of the motor 4 should be changed from the low speed rotation to the high speed rotation. This determination is made by determining whether the condition for changing the rotational frequency of the motor 4 is established based on the number of impact by the impact mechanism 6 in the speed-change mode.

More specifically, as shown in FIG. 6, the control circuit 80 first determines in S510 in the change-determination process whether the mode change SW 36 is currently placed in the ON state, and simultaneously, whether the operation mode is currently set to the speed-change mode.

If the operation mode is in the speed-change mode (S510: YES), then the control circuit 80 proceeds the process to S520 and determines whether the motor 4 is currently being driven. If the motor 4 is currently being driven (S520: YES), then the control circuit 80 proceeds the process to S530 and executes an impact determination process.

In the impact determination process, the control circuit 80 detects the impact of the impact mechanism 6 from a change in the rotational frequency of the motor 4 obtained from the detection signal transmitted by the rotation sensor 50, and counts the detected number (the number of impact). The impact may also be detected by detecting a change in current detected by the current detection circuit 76, or also by detecting a vibration generated by the impact by using a device such as an acceleration sensor. In the subsequent S540, the control circuit 80 determines whether the number of impact counted in the impact determination process is equal to or greater than a preset specified number.

If the control circuit 80 determines that the number of impact is equal to or greater than the specified number (S540: YES), then the control circuit 80 proceeds the process to S550 to set a change-determination flag indicating that the rotational state of the motor 4 is changed from the low speed rotation to the high speed rotation. If the control circuit 80 determines that the number of impact does not reach the specified number (S540: NO), then the control circuit 80 ends the change-determination process.

In S510, if the control circuit 80 determines that the operation mode is not in the speed-change mode (in other words, placed in the normal mode) (S510: NO), then the control circuit 80 proceeds the process to S560. Alternatively, in S520, if the control circuit 80 determines that the motor 4 is currently not being driven (S520: NO), then the control circuit 80 proceeds the process to S560.

In S560, the control circuit 80 clears an impact counter that is used to count the number of impact in S530 and proceeds the process to S570. In S570, the control circuit 80 clears an impact determination flag and ends the change-determination process.

As mentioned above, in response to an execution of the change-determination process in S150, the control circuit 80 proceeds the process to the subsequent S160 as shown in FIG. 3 and executes a motor control process in accordance with the procedures shown in FIG. 7 to FIG. 13. In S170, the control circuit 80 executes an output process that includes displaying the remaining energy of the battery 29 on the display panel 24, displaying the operation mode on the display panel 24, and turning on the illuminator 23. The control circuit 80 then proceeds the process to S110.

Figure 7:
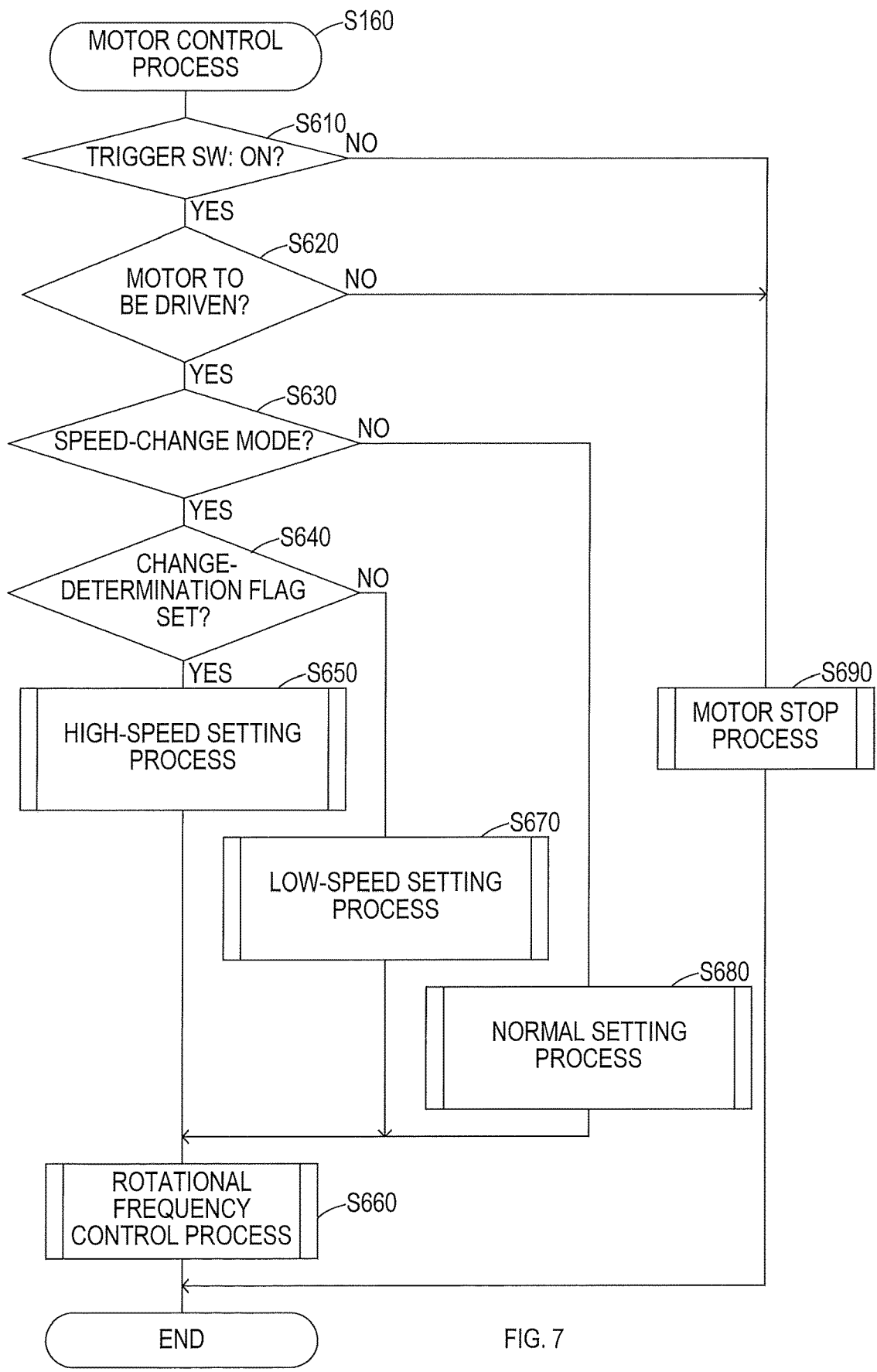
FIG. 7 is a flow chart showing motor control process executed in S160 in FIG. 3.

In the motor control process as shown in FIG. 7, the control circuit 80 first determines in S610 whether the trigger SW 32 is placed in the ON state. If the trigger SW 32 is placed in the ON state (S610: YES), then the control circuit 80 proceeds the process to S620 and determines whether the motor 4 should be driven based on factors such as the amount of manipulation on the trigger 21 detected by the manipulation amount detector 34.

If the control circuit 80 determines that the motor 4 should not be driven in S620 (S620: NO) or that the trigger 21 is placed in the OFF state in S610 (S610: NO), then the control circuit 80 proceeds the process to S690 and executes a motor stop process to stop the motor 4 and then ends the motor control process.

In this motor stop process, the control circuit 80 stops the motor 4 by causing the motor 4 to generate a braking force via the bridge circuit 72. Alternatively, the control circuit 80 places the motor 4 in a free running state by simply interrupting the current conduction by the bridge circuit 72 to eventually stop the motor 4.

If the control circuit 80 determines that the motor 4 should be driven in S620 (S620: YES), the control circuit 80 proceeds the process to S630 and determines whether the mode change SW 36 is currently placed in the ON state, and simultaneously, whether the operation mode is set to the speed-change mode. If the operation mode is set to the speed-change mode (S630: YES), then the control circuit 80 proceeds the process to S640 and determines whether the change-determination flag is set.

If the control circuit 80 determines in S640 that the change-determination flag is set (S640: YES), then the control circuit 80 proceeds the process to S650 and executes a high-speed setting process to set the command rotational frequency to high rotational frequency. The process then proceeds to S660.

Figure 8:
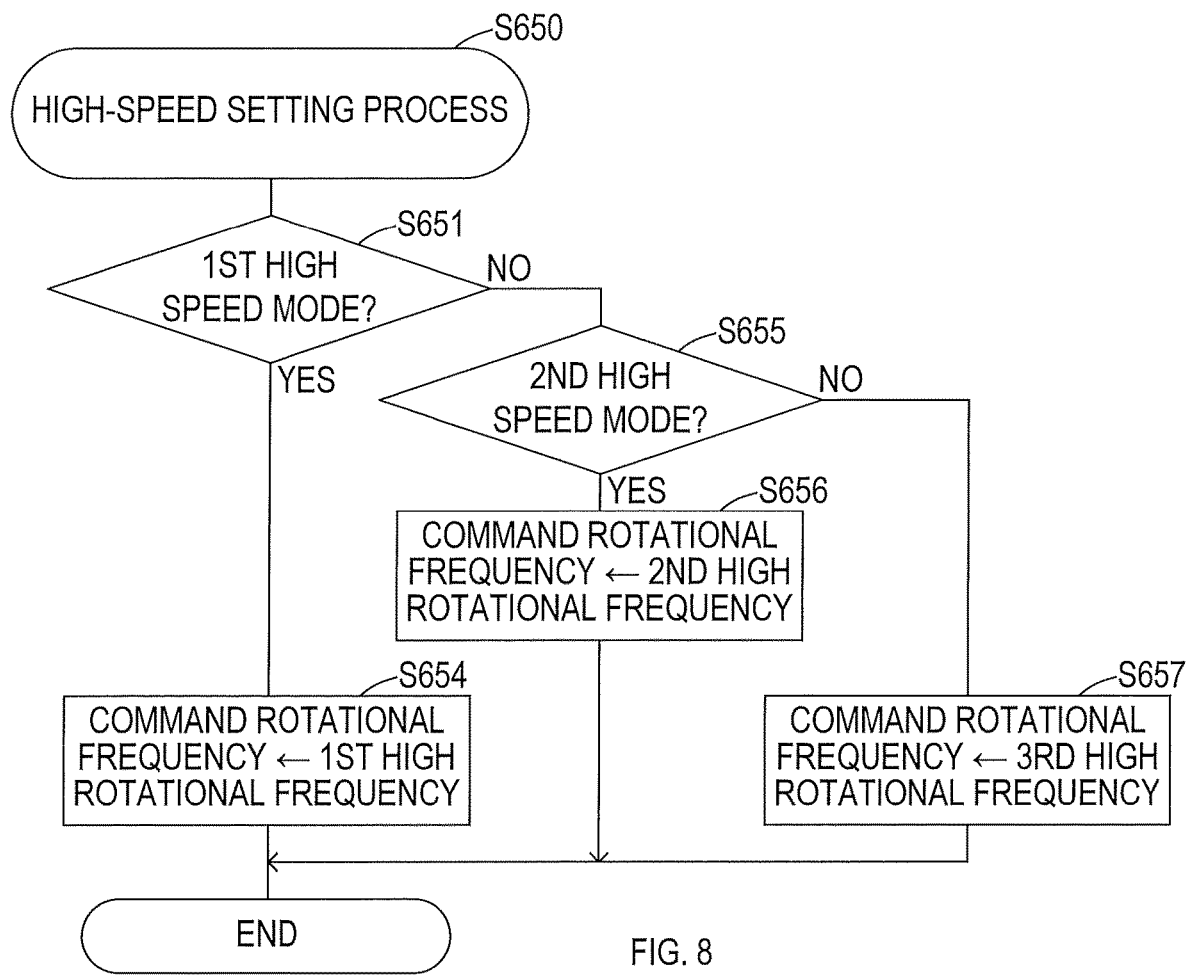
FIG. 8 is a flow chart showing high-speed setting process executed in S650 in FIG. 7.

FIG. 8 shows the procedures for the high-speed setting process.

Firstly, in S651, the control circuit 80 determines whether the first high speed mode is set in the mode-setting process.

If the first high speed mode is set (S651: YES), then the control circuit 80 proceeds the process to S654. In S654, the control circuit 80 calculates the rotational frequency of the motor 4 (first high rotational frequency) from a current amount of manipulation and the map or the arithmetic expression for the first high speed mode, sets the command rotational frequency to the first high rotational frequency, and ends the high-speed setting process.

If the control circuit 80 determines that the first high speed mode is not set (S651: NO), then the control circuit 80 proceeds the process to S655 and determines whether the second high speed mode is set in the mode-setting process.

If the second high speed mode is set (S655: YES), then the control circuit 80 proceeds the process to S656 and calculates the rotational frequency of the motor 4 (second high rotational frequency) from the current amount of manipulation and the map or the arithmetic expression for the second high speed mode, sets the command rotational frequency to the second high rotational frequency, and ends the high-speed setting process.

If the second high speed mode is not set (S655: NO), then the control circuit 80 proceeds the process to S657. In S657, the control circuit 80 calculates the rotational frequency of the motor 4 (third high rotational frequency) from the current amount of manipulation and the map or the arithmetic expression for the third high speed mode, sets the command rotational frequency to the third high rotational frequency, and ends the high-speed setting process.

As shown in FIG. 7, if the control circuit 80 determines in S640 that the change-determination flag is cleared (S640: YES), then the control circuit 80 executes a low-speed setting process in S670 to set the command rotational frequency to low rotational frequency and proceeds the process to S660.

Figure 9:
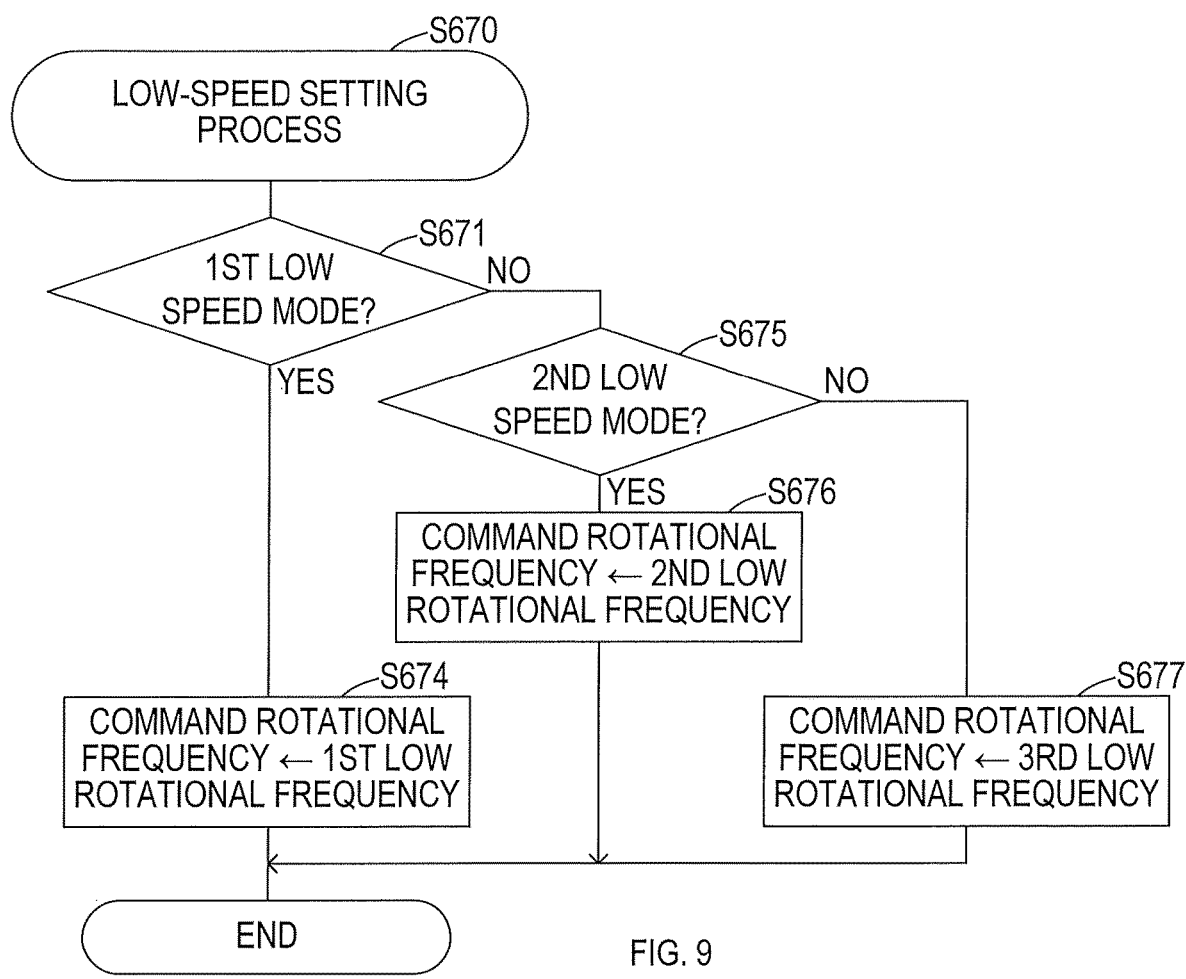
FIG. 9 is a flow chart showing low-speed setting process executed in in S670 in FIG. 7.

FIG. 9 shows the procedures for the low-speed setting process.

Firstly, in S671, the control circuit 80 determines whether the first low speed mode is set in the mode-setting process.

If the first low speed mode is set (S671: YES), then the control circuit 80 proceeds the process to S674. In S674, the control circuit 80 calculates the rotational frequency of the motor 4 (first low rotational frequency) from the current amount of manipulation and the map or the arithmetic expression for the first low speed mode, sets the command rotational frequency to the first low rotational frequency, and ends the low-speed setting process.

If the first low speed mode is not set (S671: NO), then the control circuit 80 proceeds the process to S675. In S675, the control circuit 80 determines whether the second low speed mode is set in the mode-setting process.

If the second low speed mode is set (S675: YES), then the control circuit 80 proceeds the process to S676. In S676, the control circuit 80 calculates the rotational frequency of the motor 4 (second low rotational frequency) from the current amount of manipulation and the map or the arithmetic expression for the second low speed mode, sets the command rotational frequency to the second low rotational frequency, and ends the low-speed setting process.

If the second low speed mode is not set (S675: NO), then the control circuit 80 calculates the rotational frequency of the motor 4 (third low rotational frequency) from the current amount of manipulation and the map or the arithmetic expression for the third low-speed mode, sets the command rotational frequency to the third low rotational frequency, and ends the low-speed setting process.

Figure 10:
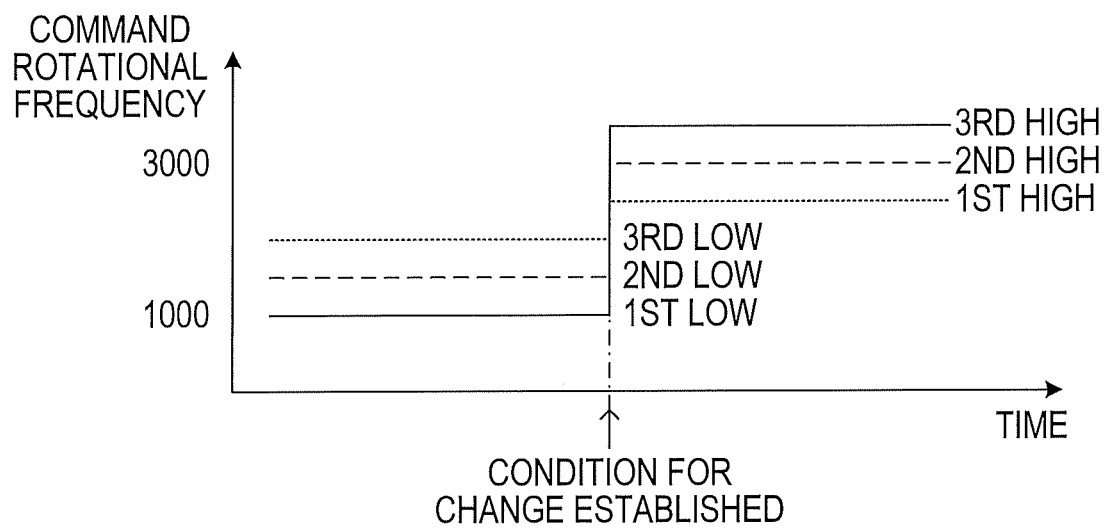
FIG. 10 is an explanatory diagram showing commanding rotational frequency of the motor that is set in the speed-change mode.

Accordingly, as shown in FIG. 10, the command rotational frequency is set to any one of the first to third low rotational frequencies when the operation mode of the driver 1 is the speed-change mode and the change-determination flag is not set (in other words, condition for change is not established) at the time the motor 4 is being driven.

If the number of impact subsequently reaches the specified number, then the condition for change is established and also the change-determination flag is set. In response to the change-determination flag being set, the command rotational frequency is changed to any one of the first to third high rotational frequencies.

In FIG. 10, each of the first to third low rotational frequencies and the first to third high rotational frequencies is constant. FIG. 10 shows the first to third low rotational frequencies and the first to third high rotational frequencies when the manipulation on the trigger 2 is constant; in reality, these rotational frequencies varies depending on the amount of manipulation.

Returning to S630 in FIG. 7, if the control circuit 80 determines that the operation mode is not the speed-change mode (in other words, that the operation mode is set to the normal mode) (S630: NO), then the control circuit 80 proceeds the process to S680. In S680, the control circuit 80 executes the normal setting process and sets the command rotational frequency simply depending on the amount of manipulation on the trigger 21 without changing the command rotational frequency from any one of the first to third low rotational frequencies to any one of the first to third high rotational frequencies.

Figure 11:
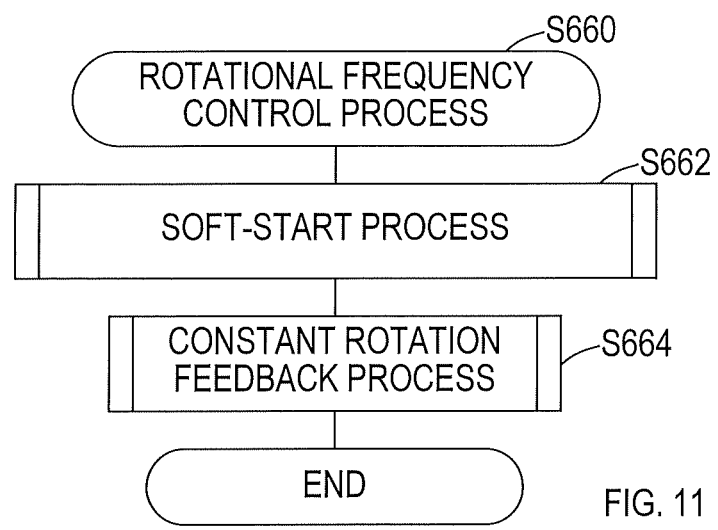
FIG. 11 is a flow chart showing rotational frequency control process executed in S660 in FIG. 7.

In S660, the control circuit 80 executes a rotational frequency control process shown in FIG. 11 to control the rotational frequency of the motor 4 in accordance with the command rotational frequency set in S650, S670, or S680.

As shown in FIG. 11, in the rotational frequency control process, the control circuit 80 first executes a soft-start process in S662 and sets a control rotational frequency for an actual drive of the motor 4 based on the command rotational frequency.

In the subsequent S664, the control circuit 80 executes a constant rotation feedback process and then ends the rotational frequency control process. In the constant rotation feedback process, the control circuit 80 performs a feedback control of the conduction current to the motor 4 such that the actual rotational frequency of the motor 4 matches the control rotational frequency.

More specifically, in the constant rotation feedback process, the control circuit 80 controls the rotational frequency of the motor 4 to match the control rotational frequency by varying the drive duty ratio for a pulse width modulation (PWM) control of the conduction current to the motor 4.

The aforementioned soft-start process is executed for a stable and reliable acceleration of the motor 4 immediately after initiating the drive of the motor 4 or at the time of shifting the rotational state of the motor 4 from the low speed rotation to the high speed rotation. The control rotational frequency is gradually changed to match the command rotational frequency.

In the soft-start process, the control circuit 80 sets the control rotational frequency when increasing the rotation of the motor 4 from the low speed rotation to the high speed rotation in the speed-change mode such that an amount of change in the rotational frequency corresponds to the first change rate (the first slope A) or the second change rate (the second slope B) included in the control pattern that is selected in the mode-setting process.

Figure 12:
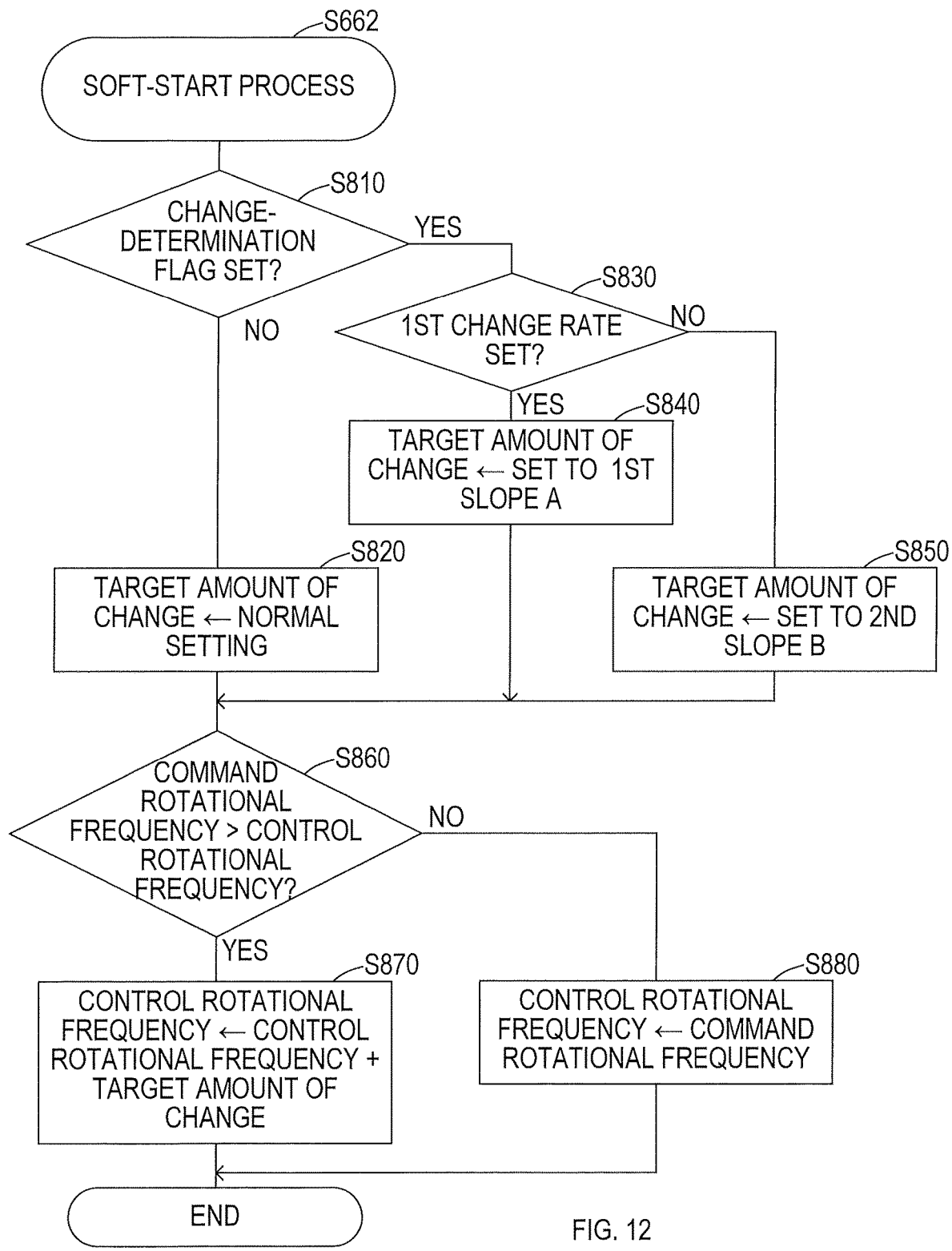
FIG. 12 is a flow chart showing a soft-start process executed in S662 in FIG. 11.

FIG. 12 shows the soft-start process. Firstly, in S810, the control circuit 80 determines whether the change-determination flag is set. If the change-determination flag is not set (S810: NO), then the control circuit 80 proceeds the process to S820. In S820, the control circuit 80 sets a target amount of change to a normal value, which is used to increase the rotation of the motor 4 immediately after initiating the drive of the motor 4.

If the change-determination flag is set (S810: YES), then the control circuit 80 proceeds the process to S830 and determines whether the first change rate (that is, the first slope A) is set in the selected control pattern.

If the first change rate is set (S830: YES), then the control circuit 80 proceeds the process to S840 and sets the target amount of change to an amount of change corresponding to the first slope A. If the second change rate is set (S830: NO), then the control circuit 80 proceeds the process to S850 and sets the target amount of change to an amount of change corresponding to the second slope B.

In response to the target amount of change being set in S820, S840 or S850, the control circuit 80 proceeds the process to S860 and determines whether the command rotational frequency is greater than the control rotational frequency currently used to control the motor 4. The control rotational frequency at the time of initiating the drive of the motor 4 is zero since the motor 4 is stopped.

If the control circuit 80 determines in S860 that the command rotational frequency is greater than the control rotational frequency (S860: YES), then the control circuit 80 proceeds the process to S870. In S870, the control circuit 80 updates the control rotational frequency by adding the target amount of change, which is set in S820, S840 or S850, to the current control rotational frequency and ends the soft-start process.

If the control circuit 80 determines that the command rotational frequency is equal to or less than the control rotational frequency (S860: NO), then the control circuit 80 proceeds the process to S880 and sets the control rotational frequency to the command rotational frequency and ends the soft-start process.

Figure 13:
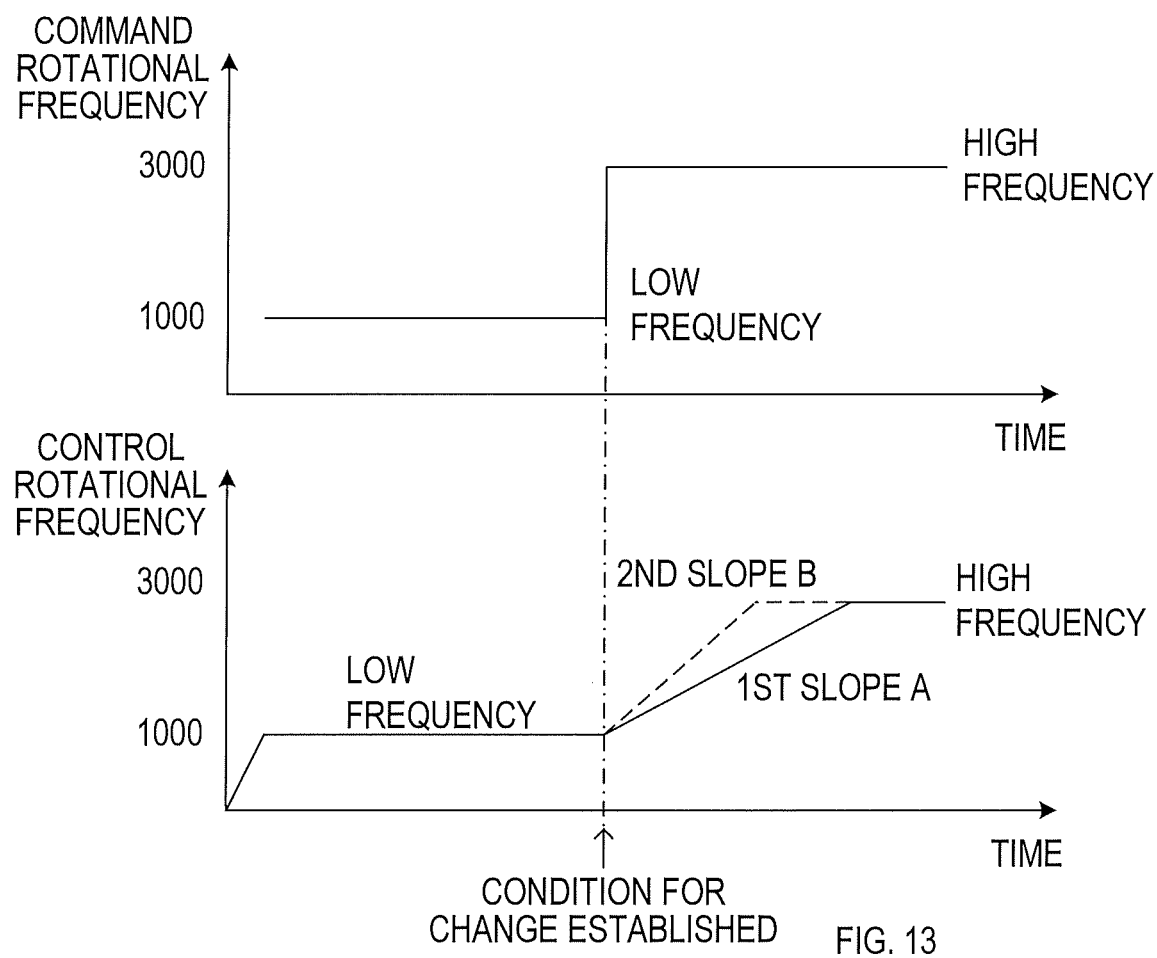
FIG. 13 is an explanatory diagram showing control rotational frequency that is set in the soft-start process.

As a consequence, as shown in FIG. 13, the control rotational frequency that is used in S662 to control the rotational frequency of the motor 4 increases at a normal change rate at the time of initiating the drive of the motor 4. The control rotational frequency increases with the first slope A or the second slope B at the time of changing the rotational state of the motor 4 from the low speed rotation to the high speed rotation in the speed-change mode.

As it has been explained above, in the driver 1 in the present embodiment, if the operation mode at the time of driving the motor 4 is the speed-change mode, then the rotational state of the motor 4 is changed from the low speed rotation to the high speed rotation in response to an establishment of the condition for change, which is achieved by the number of impact reaching the specified number after the drive of the motor 4 is initiated.

In accordance with the control pattern that is selected by the user's manipulation on the impact force change SW 38, the rotational frequency of the motor 4 (namely, the first to third low rotational frequencies and the first to third high rotational frequencies) and the change characteristic in changing the rotational frequency from any one of the first to third low rotational frequencies to any one of the first to third high rotational frequencies are set.

The change characteristic is defined by the change rate. Although in cases where the rotational frequency in the high speed rotation is the same, different change rate (the first slope A or the second slope B) can be set in accordance with the control pattern selected by the user's manipulation on the impact force change SW 38.

Thus, with respect to the driver 1 in the present embodiment, the change characteristic in changing the rotational state of the motor 4 from the low speed rotation to the high speed rotation in the speed-change mode can be changed depending on the type of a fastener to be used and a working environment.

The usability of the driver 1 in the present embodiment is thus improved for the user, and the work efficiency on the fastener can also be improved.

In the present embodiment, the control circuit 80 corresponds to one example of the controller in the present disclosure. In addition, the impact force change SW 38 and the soft-start process, which is to change the amount of change in accordance with the control pattern set via the impact force change SW 38, function as one example of a setter in the present disclosure.

One embodiment of the present disclosure has been explained above; nevertheless the present disclosure is not limited to the aforementioned embodiment, but can also be modified in various modes.

First Modified Example

In the aforementioned embodiment, the change characteristic is explained as being set to either the first slope A or the second slope B in accordance with the control pattern that is selected by the user's manipulation on the impact force change SW 38.

However, this change characteristic may be set automatically depending on the state of the motor 4 before its rotational state is changed from the low speed rotation to the high speed rotation.

Figure 14:
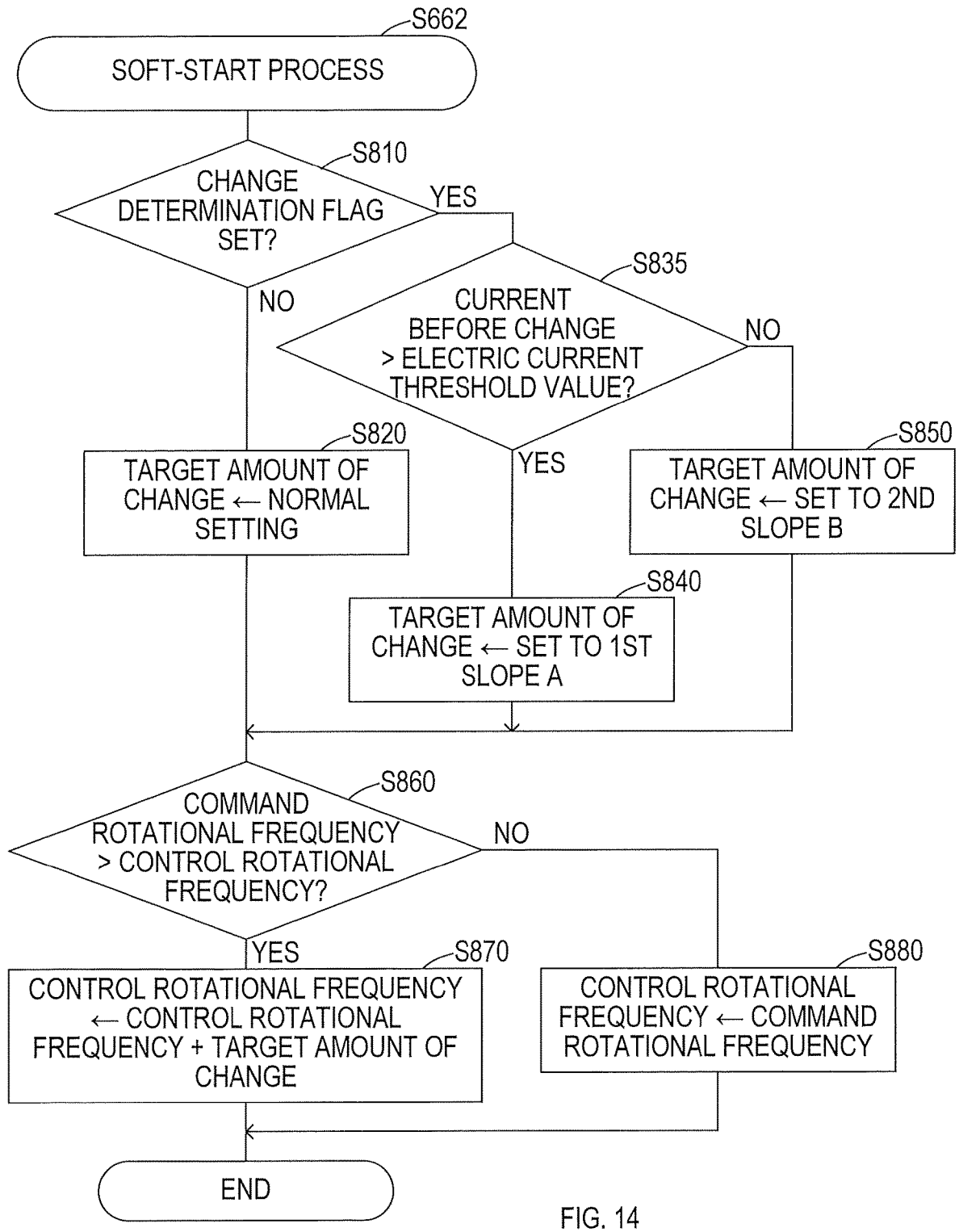
FIG. 14 is a flow chart showing a modified example of the soft-start process.

For example, as shown in FIG. 14, if the control circuit 80 determines in S810 that the change-determination flag is set in the soft-start process (S810: YES), then the control circuit 80 proceeds the process to S835. In S835, the control circuit 80 determines whether a value of the conduction current to the motor 4 before changing the rotational state of the motor 4 is greater than an electric current threshold value.

If the value of the conduction current before changing the rotational state is greater than the electric current threshold value (S835: YES), in other words, if the load imposed on the motor 4 is large, then the control circuit 80 proceeds the process to S840 and sets the target amount of change to an amount of change corresponding to the first slope A.

Contrarily, if the value of the conduction current before changing the rotational state is equal to or less than the electric current threshold value (S835: NO), in other words, if the load imposed on the motor 4 is small, then the control circuit 80 proceeds the process to S850 and sets the target amount of change to an amount of change corresponding to the second slope B.

In such a configuration of the first modified example, disengagement of the driver bit, which is attached to the tip of the anvil 15, from a fastener (that is, a screw) can be reduced or prevented by allowing a slow increase in the rotational frequency of the motor 4 in a case where the load imposed on the motor 4 is large at the low speed rotation compared with a case where the load is small.

The soft-start process shown in FIG. 14 is executed in the similar manner as the soft-start process shown in FIG. 12 except for the aforementioned S835.

In addition, it is not always necessary to use the value of the conduction current to the motor 4 detected by the electric current detection circuit 76 to enable an automatic change of the change characteristic as shown in the first modified example.

More specifically, the control circuit 80 may set the target amount of change by using parameters such as the rotational frequency detected based on the detection signal from the rotation sensor 50, a length of time since the drive of the motor 4 is initiated until the condition for change is established and the change-determination flag is set, and others.

In the aforementioned embodiment and the first modified example, the first slope A and the second slope B are used to set the target amount of change. Nevertheless, another slope may be used in addition to the first slope A and the second slope B.

If the control circuit 80 has more than three types of slopes, then more change characteristics are available when changing the rotational state of the motor 4 from the low speed rotation to the high sped rotation, which enables a selection of more suitable change characteristic for any types of fasteners.

In addition, in the aforementioned embodiment and the first modified example, the change characteristics are linear so that the control rotational frequency increases at a specified change rate (the first slope A or the second slope B). Nevertheless, the change characteristic may be made non-linear defined by a quadratic function, for example.

Second Modified Example

In the aforementioned embodiment, it is explained that, in the motor control process, a control variable of the motor 4 is set to the command rotational frequency, which is the target rotational frequency of the motor 4, and the control rotational frequency for actually controlling the motor 4 is set based on the command rotational frequency.

This is for executing a feed-back control to match the rotational frequency of the motor 4 to the control rotational frequency; nevertheless, it is not always necessary to execute the feed-back control to drive the motor 4.

More specifically, for example, an open loop control may be executed by setting a duty ratio (drive duty ratio) of the PWM signal, which is used to control the conduction current to the motor 4, as the control variable of the motor 4.

In this case, a command duty ratio (COMMAND DUTY in FIG. 15) may be set individually for the first to third low speed mode, the first to third high speed mode, and the normal mode in S650, S670, and S680, in accordance with the amount of manipulation.

In addition, the amount of change in the drive duty ratio (DRIVE DUTY in FIG. 15) may be set corresponding to the normal change rate, the first change rate having the first slope A, and the second change rate having the second slope B respectively in S820, S840, and S850 in the soft-start process shown in FIG. 12 and FIG. 14.

Figure 15:
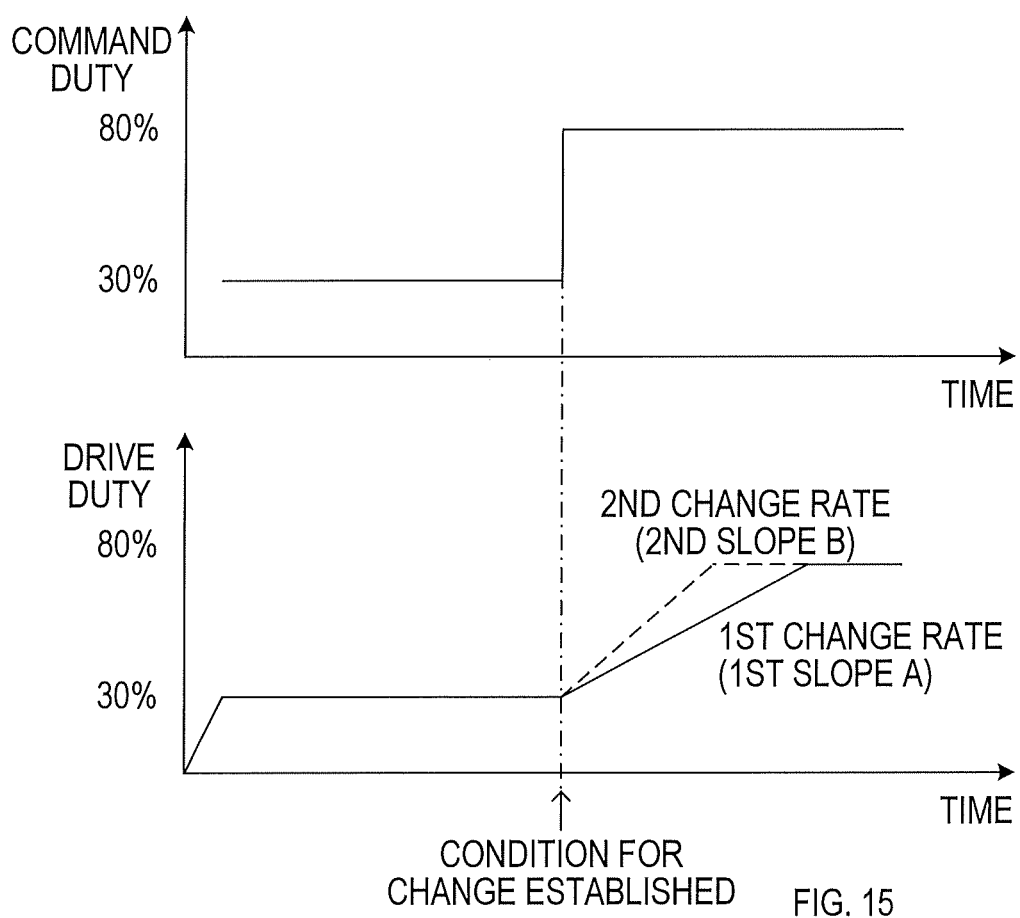
FIG. 15 is an explanatory diagram showing relations between command duty ratio and drive duty ratio in controlling the motor by setting the drive duty ratio in motor control process.

According to the second modified example, as shown in FIG. 15, the COMMAND DUTY can be changed in two steps, namely before and after the condition for change is established, in the speed-change mode. In addition, the DRIVE DUTY gradually increases to the COMMAND DUTY at each of the aforementioned change rates immediately after the initiation of the drive of the motor 4 and at the time of changing the rotational state of the motor 4 from the low speed rotation to the high speed rotation.

Accordingly, in a case of drive controlling the motor 4 by the open loop control, the drive duty ratio (DRIVE DUTY) can still be set similarly to the aforementioned embodiment; and an effect similar to the aforementioned embodiment can be obtained.

Other Modified Examples

In the aforementioned embodiment, it is explained that the control pattern of the motor 4 in the speed-change mode is sequentially changeable to any one of the control patterns by the user's manipulation (pressing manipulation) on the impact force change SW 38.

However, the control pattern may also be selected, for example, by using a dial switch or two or more switches. Alternatively, the control pattern may also be selected by transmitting a command to select the control pattern to the wireless dongle 60 through manipulation on an external device such as a smartphone.

Moreover, the electric working machine in the present disclosure is not limited to a rechargeable impact driver such as the driver 1 and may be, for example, a rotary impact tool, such as an impact wrench, that includes an impact mechanism driven by a motor, or any other electric working machines that includes no impact mechanisms.

The technique in the present disclosure may be applied to any electric working machine, similarly to the aforementioned embodiment, that is configured to change the rotational state of a motor from a low speed rotation to a high speed rotation in response to an establishment of a specified condition for change, such as an increase in a load after the initiation of the drive of the motor, and an effect similar to the aforementioned embodiment can be obtained.

In the aforementioned embodiment, the condition for changing the rotational frequency of the motor 4 is based on the number of impact. Nevertheless, if the electric working machine includes no impact mechanism, then the condition for change may be set based on the load (such as the conduction current) on the motor. The condition for change may also be based on user's manipulation on the trigger.

In the aforementioned embodiment, the motor 4 is not limited to the three-phase brushless motor. The motor 4 may also be implemented with any motor that can rotatably drive the output shaft of the electric working machine. The electric working machine in the present disclosure is not limited to the battery-driven electric working machine as described in the aforementioned embodiment. The present disclosure may be applied to any electric working machine that receives an electric power through a cord, or to any electric working machine that is configured to rotatably drive a tool element by an alternating-current motor.

In addition, two or more functions of one element in the aforementioned embodiment may be achieved by two or more elements; or one function of one element in the aforementioned embodiment may be achieved by two or more elements. Likewise, two or more functions of two or more elements may be achieved by one element; or one function achieved by two or more elements may be achieved by one element. A part of the configuration of the aforementioned embodiment may be omitted; and at least a part of the configuration of the aforementioned embodiment may be added to or replaced with another part of the configuration of the aforementioned embodiment. It should be noted that any and all modes that are encompassed in the technical ideas that are defined only by the languages in the claims are embodiments of the present disclosure.

What is claimed is:

1. An electric working machine comprising:
a motor,
a setter configured to modifiably set a change characteristic in changing a rotational state of the motor from a low speed rotation to a high speed rotation, the high speed rotation being greater than the low speed rotation in a rotational frequency of the motor, and
a controller configured to control a rotational state of the motor, the controller being configured to initiate the motor at the low speed rotation, the controller being further configured to change the rotational state of the motor, in response to an establishment of a given condition for change after an initiation of the motor, from the low speed rotation to the high speed rotation in accordance with the change characteristic set by the setter, wherein:

the setter is configured to modifiably set the change characteristic in accordance with a magnitude of a load imposed on the motor during a period from the initiation of the motor to the establishment of the condition for change, the setter is configured to modifiably set the change characteristic such that the larger the magnitude of the load is, the less an increase rate of the rotational frequency of the motor becomes, and the controller is further configured to change the rotational state of the motor before a stop of the motor, in response to the establishment of the given condition for change after the initiation of the motor, from the low speed rotation to the high speed rotation in accordance with the change characteristic set by the setter.

2. The electric working machine according to claim 1, wherein the change characteristic specifies a change rate from the low speed rotation to the high speed rotation.

3. The electric working machine according to claim 1, wherein:

the controller is configured to control a duty ratio of a drive signal of the motor, the change characteristic specifies a change rate of the duty ratio of the drive signal from a first duty ratio to a second duty ratio, the first duty ratio corresponds to the low speed rotation, and the second duty ratio corresponds to the high speed rotation.

4. The electric working machine according to claim 1, further comprising:

an impact mechanism, and an impact detector configured to detect an impact by the impact mechanism, wherein:

the controller is configured to increment a count value in response to the impact detector detecting the impact by the impact mechanism, and the controller is further configured to determine whether the condition for change is established based on the count value.

5. The electric working machine according to claim 1, further comprising:

a manipulator configured to be manipulated by a user of the electric working machine to manipulate the rotational state of the motor, wherein the setter is arranged in the electric working machine separately from the manipulator.

* * * * *